US012437655B2

(12) United States Patent
Polaina Morales et al.

(10) Patent No.: US 12,437,655 B2
(45) Date of Patent: Oct. 7, 2025

(54) FLIGHT PLAN EVALUATION

(71) Applicant: THE BOEING COMPANY, Arlington, VA (US)

(72) Inventors: Manuel Polaina Morales, Munich (DE); Javier Lopez Leones, Majadahonda (ES); Rubén Vega Astorga, Leganés (ES)

(73) Assignee: The Boeing Company, Arlington, VA (US)

( * ) Notice: Subject to any disclaimer, the term of this patent is extended or adjusted under 35 U.S.C. 154(b) by 176 days.

(21) Appl. No.: 18/325,902

(22) Filed: May 30, 2023

(65) Prior Publication Data

US 2024/0404413 A1 Dec. 5, 2024

(51) Int. Cl.
*G08G 5/20* (2025.01)
*G08G 5/34* (2025.01)

(52) U.S. Cl.
CPC .............. *G08G 5/34* (2025.01); *G08G 5/20* (2025.01)

(58) Field of Classification Search
None
See application file for complete search history.

(56) References Cited

U.S. PATENT DOCUMENTS

| | | | | |
|---|---|---|---|---|
| 8,768,607 B2* | 7/2014 | Righi | ..................... | B64D 37/00 701/1 |
| 10,086,948 B2 | 10/2018 | Gallo Olalla | | |
| 2015/0279218 A1* | 10/2015 | Irrgang | ................ | G08G 5/0056 701/3 |
| 2016/0063867 A1* | 3/2016 | Zammit | ................. | G08G 5/025 701/18 |
| 2018/0261105 A1* | 9/2018 | Garrido-Lopez | ........ | G07C 5/12 |
| 2018/0268722 A1* | 9/2018 | Meier | .................... | G01C 21/20 |
| 2021/0383706 A1* | 12/2021 | Gibbons, II | ......... | G08G 5/0052 |

OTHER PUBLICATIONS

Patroumpas, K., Pelekis N., Theodoris Y. "On-the-fly Mobility Event Detection over Aircraft Trajectories". SIGSPATIAL '18, Nov. 2018.
Bonifazi, A., Sun, J., van Baren, G., & Hoekstra, J. M. "Modeling and Detecting Anomalous Safety Events in Approach Flights Using ADS-B Data". Paper presented at 14th USA/Europe Air Traffic Management Seminar, 2021.

(Continued)

*Primary Examiner* — James M McPherson
(74) *Attorney, Agent, or Firm* — Alleman Hall & Tuttle LLP

(57) ABSTRACT

Aspects of the present disclosure provide systems and methods for evaluating a flight plan with respect to an executed route of an aircraft. An example method includes obtaining data associated with a route of a vehicle. The method further includes determining a first cost index associated with the route based at least in part on a segment of the data. The method further includes comparing the first cost index to a second cost index associated with a plan for the route. The method further includes determining a cost penalty associated with the route based at least in part on the comparison between the first cost index and the second cost index. The method further includes performing one or more actions associated with the vehicle in response to determining the cost penalty.

20 Claims, 8 Drawing Sheets

(56) References Cited

OTHER PUBLICATIONS

Proud, S.R. "Go-Around Detection Using Crowd-Sourced ADS-B Position Data". Aerospace 2020, 7, 16.
"BADA: Base of aircraft data: Realistically model the performance of any aircraft," Eurocontrol, Date Accessed: Sep. 20, 2023, pp. 1-4.
European Patent Application Titled: "Methodology to derive a calibrated physics-based APMs from various sources of performance data," Application No. 22382877.3, Filed on Sep. 23, 2022.

* cited by examiner

FLIGHT PLAN EVALUATION

FIELD

The present disclosure relates to vehicle analytics. More particularly, the present disclosure relates to analytics of a vehicle route.

BACKGROUND

Airline flight operations are a complex decision-making process subject to several factors. Weather, maintenance, utilization, airport rules, crew and passenger connections, and pre-flight tasks (like fueling, cargo handling, and provisioning) are among the many factors that can affect the operating costs of aircraft. Airlines may consider these factors in their strategic and tactical flight planning, with possible impacts on the choice of cruise speed and/or route for a given flight. The planned and the actually performed speed has a direct impact on the airline expenses and operations associated with the flight. For example, fuel consumption increases, as an aircraft flies at higher speeds, or decreases, as the aircraft flies at a lower speed. Since fuel costs represent one of the main costs for airlines, an initiative to reduce them becomes an airline's interest. This is intensified in the scenario where airlines seek to reduce carbon emissions. Another direct impact is on the flight's duration, which increases as aircraft flies at lower speeds. In this case, there are time-related costs that gain importance as the flight time increases, such as passengers' preference for shorter flights.

Airlines may determine a flight plan for a given aircraft to provide a cost-efficient flight. The flight plan may provide, for example, a route and/or a speed for a flight that minimizes fuel consumption and/or carbon emissions. Airlines may use a cost index (CI) value for each aircraft and route to determine the economic speed (e.g., the ECON Mach number) of an aircraft for a given flight. The CI may be determined based on various parameters, including, for example, financial records, current fuel price, crew, maintenance, and delay costs. In some cases, the aircraft may deviate from the flight plan, for example, due to weather, airport delays, aircraft complications, etc.

SUMMARY

Some aspects provide a method. The method includes obtaining data associated with a route of a vehicle. The method further includes determining a first cost index associated with the route based at least in part on a segment of the data. The method further includes comparing the first cost index to a second cost index associated with a plan for the route. The method further includes determining a cost penalty associated with the route based at least in part on the comparison between the first cost index and the second cost index. The method further includes performing one or more actions associated with the vehicle in response to determining the cost penalty.

Some aspects provide an apparatus. The apparatus includes a memory and a processor coupled to the memory. The processor is configured to obtain data associated with a route of a vehicle; determine a first cost index associated with the route based at least in part on a segment of the data; compare the first cost index to a second cost index associated with a plan for the route; determine a cost penalty associated with the route based at least in part on the comparison between the first cost index and the second cost index; and perform one or more actions associated with the vehicle in response to determining the cost penalty.

Some aspects provide a computer-readable medium. The computer-readable medium has instructions stored thereon, that when executed by an apparatus, cause the apparatus to perform operations including obtaining data associated with a route of a vehicle; determining a first cost index associated with the route based at least in part on a segment of the data; comparing the first cost index to a second cost index associated with a plan for the route; determining a cost penalty associated with the route based at least in part on the comparison between the first cost index and the second cost index; and performing one or more actions associated with the vehicle in response to determining the cost penalty.

BRIEF DESCRIPTION OF THE DRAWINGS

So that the manner in which the above recited features can be understood in detail, a more particular description, briefly summarized above, may be had by reference to example embodiments, some of which are illustrated in the appended drawings.

DETAILED DESCRIPTION

Figure 1:
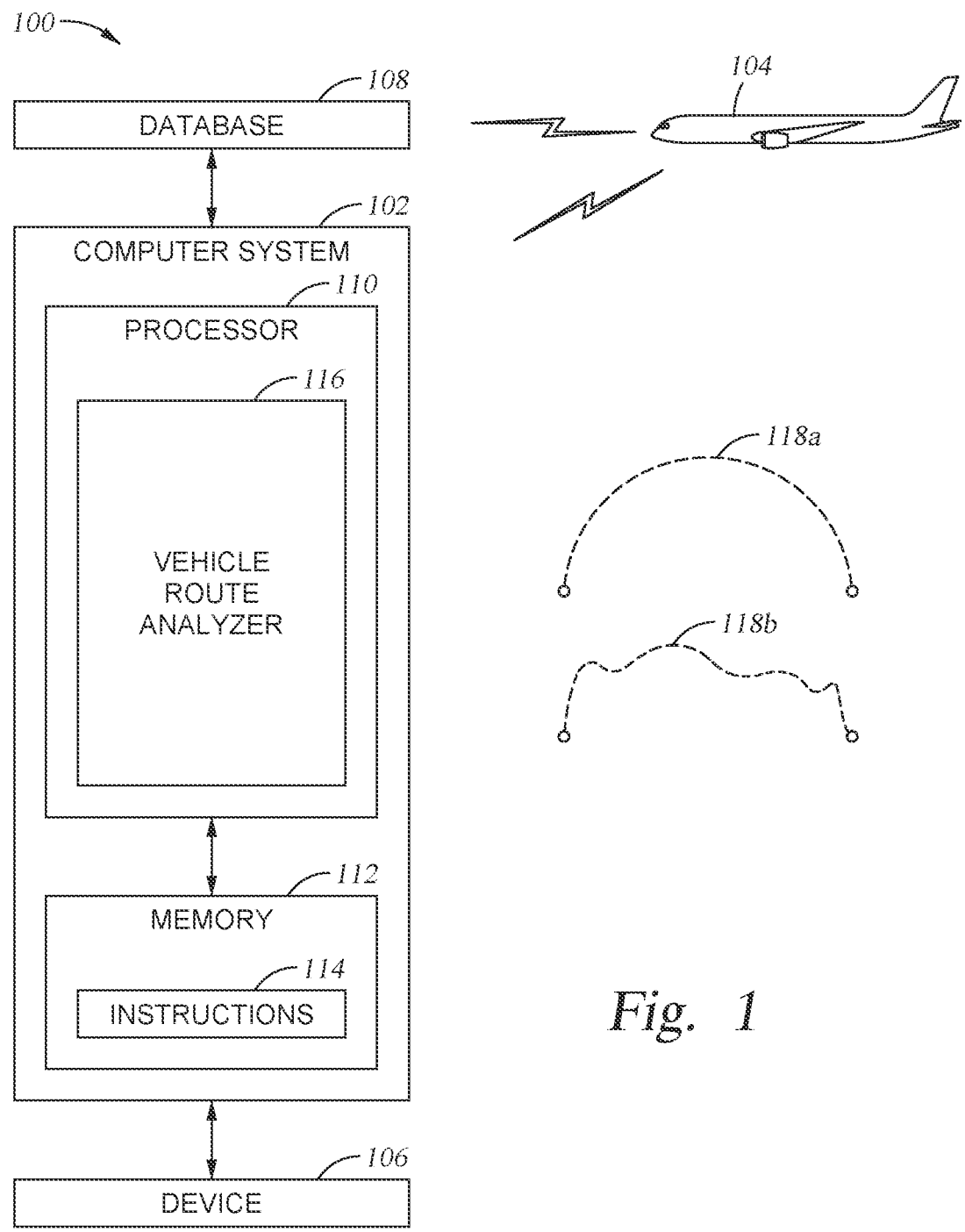
FIG. 1 is a diagram illustrating an example system that evaluates a planned route of a vehicle with respect to an executed route of the vehicle.

Aspects of the present disclosure provide apparatus, methods, processing systems, and computer-readable mediums for evaluating a flight plan with respect to an executed route of an aircraft.

In some cases, the operating costs of an airline may constitute close to 50% of all costs of an airline. The operating costs may be affected by various factors, such as weather, maintenance, utilization, airport rules, crew and passenger connections, and pre-flight tasks like fueling, cargo handling, and provisioning. Differences in flight operating modes (e.g., cost index or speed scheduling) can lead to over 5% of cost increase during a cruise phase of flight, for example. In this regard, events that cause disruptions to the planned execution of a flight may negatively impact both the cost efficiency and the environmental efficiency of a flight. To this end, airlines use a cost index (CI) value for each aircraft and route, that is input into a Flight Management Computer (FMC), calculated using various parameters, such as financial records, current fuel price, crew, maintenance, and delay costs. The FMC may determine a flight plan for the flight using an aircraft performance model. The flight plan may provide, for example, a route and/or a speed for a flight that minimizes fuel consumption and/or carbon emissions. In some cases, a flight may deviate from the flight plan, for example, due to weather, delays, aircraft operational performance, etc. Airlines lack a tool that evaluates the flight plan with respect to the executed flight path of an aircraft, and therefore, it can be challenging to assess the performance of a flight plan.

Aspects of the present disclosure provide apparatus and methods for evaluating a flight plan with respect to an executed route of an aircraft. A computer system may analyze flight recorded data (e.g. Quick Access Recorder (QAR) data) using descriptive analytics techniques to detect and quantify flight events that have an impact on the operational efficiency of the flight. The computer system may detect cost-incurring events that could potentially have had an impact in the cost or environmental impact of a flight. The analysis may be done by dividing the cruise phase into different segments, calculating a cost index (CI) value per each segment, and finding differences between the actual CI values and the nominal CI values associated with an operational flight plan (OFP). In the case in which certain differences are found, a simulated cost of the OFP may be determined to estimate the trip cost penalty incurred due to the cost-impacting events. Even if no cost-impacting events were detected during the cruise phase, the computer system may determine a specific CI value and cost penalty (e.g., zero) for a particular flight.

Using the system described herein, an airline can detect flights, where the ECON speed (e.g., the ECON Mach number) was not followed by the aircraft (e.g., partially or wholly during cruise) as calculated given the CI prescribed in the OFP. Furthermore, the airline can quantify the impact in cost of the cruise segments and plan future corrections on operations. The system described herein may be implemented in an application programming interface (API) to return various information related to aircraft and/or a flight, including the CI and/or cost penalty as described herein. The system described herein may use tailored performance data based on a calibrated performance model (e.g., Base of Aircraft Data (BADA)) and/or manufacturer performance data (e.g., a look-up table) for the calculations. For example, the system may determine the degradation factors from flown data and using such data to correct the performance model or manufacturer performance data associated with the aircraft type. Using the performance model allows the system described herein to support most commercial aircraft without the use of confidential data associated with aircraft.

The apparatus and methods for flight path evaluation described herein may provide various advantages. For example, the apparatus and methods for flight path evaluation described herein may allow a vehicle operator (e.g., a fleet operator including an airline) to evaluate the economic and/or environmental impact associated with a flight as compared to a pre-planned route. Such an evaluation can be used to identify any of various issues with a vehicle and/or a route, such as identifying whether to make economic adjustments to the price of a flight, whether to make adjustments to a flight plan, whether to update a model used to generate the flight plan, whether to inspect an aircraft for mechanical issues or maintenance, whether to perform maintenance or retire an aircraft. Such an evaluation can facilitate improved profitability of an aircraft and/or fleet or a reduction in the environmental impact of an aircraft and/or fleet.

FIG. 1 is a diagram of an example system 100 that evaluates a planned route of a vehicle with respect to an executed route of the vehicle. The system 100 may include a computer system 102. In some aspects, the system 100 may further include a vehicle 104, one or more devices 106, and/or a database 108.

The computer system 102 may be or include a computational device, including for example, a computer, server, desktop computer, laptop computer, tablet computer, smart phone, smart watch or other wearable computer, mainframe computer, quantum computer or any other form of computer or mobile computational device now known or to be developed in the future that is capable of running a program, accessing a network or querying a database, such as the database 108. In certain aspects, a computer-implemented method (for example, as further described herein with respect to FIG. 8) may be performed at the computer system 102 among multiple computers and/or between multiple locations. In some aspects, the computer system 102 may be implemented in a cloud computing environment. The computer system 102 may be in communication with the vehicle 104, the device(s) 106, and/or the database 108.

The computer system 102 may include one or more processors, processing blocks or processing elements (collectively "the processor 110") and one or more memory blocks or elements (collectively "the memory 112"). The processor 110 may be coupled to and/or in communication with the memory 112. The memory 112 includes a computer-readable medium that stores instructions 114 that are executable by the processor 110. The instructions 114 are executable to initiate, perform, or control operations to evaluate a planned route of the vehicle 104 with respect to an executed route of the vehicle 104. The processor 110 may include a vehicle route analyzer 116 that evaluates the planned route 118a of the vehicle 104 with respect to the executed route 118b of the vehicle 104, as further described herein with respect to FIG. 2.

The vehicle 104 may be or include a mode of transport including, for example, an aircraft, spacecraft, watercraft, barge, car, bus, truck, motorcycle, train, railway, trolley, pipeline, combinations thereof, etc. In some examples, the computer system 102 is external to the vehicle 104. In other examples, the computer system 102 is integrated in the vehicle 104. In some sections, the present disclosure may be focused on the vehicle 104 being an aircraft and evaluating a flight plan for the aircraft to keep the present disclosure as simple as possible. It will be appreciated that the vehicle 104 may be or include other modes of transport, and aspects of the flight plan evaluation described herein may be applied to evaluating planned routes of such modes of transport.

In this example, the vehicle 104 may travel a route 118b (e.g., an executed route). With respect to the vehicle being an aircraft, the route may be a flight path with a flight plan (e.g., a planned route 118a and/or planned speed). In some cases, the executed route 118b and/or speed may deviate from the flight plan (e.g., the planned route 118a and/or planned speed), due to any of various factors, such as weather, delays, operational issues with the vehicle, etc. In this example, the vehicle 104 travels the route 118b from a first position (e.g., a starting position) to a second position (e.g., an ending position) different from the first position. As shown, the ending position of the route 118b is displaced from the starting position of the route 118b. In some cases, the vehicle 104 may travel the route 118b beginning at a particular position and ending at the same position (or effectively the same position, such as the same airport). In certain aspects, the route evaluation described herein may evaluate a portion, a segment, or a phase of the route 118b, such as one or more phases of a flight. For example, the route evaluation described herein may evaluate the cruise phase of a flight, as the cruise phase may represent the largest share of the flight.

The device(s) 106 may be or include an end user device, for example, any computer system, computational device, or computing device that is used and controlled by an end user (e.g., an agent or employee of a fleet operator, an airline employee including, for example, fleet operations personnel, a flight crew, maintenance crew, aircraft technician, etc.). In some examples, the device(s) 106 may include a portable computational device (such as a tablet computer, smart phone, etc.), a ground control device, an electronic flight bag, an airline server, a display device, a communication device, or a combination thereof. To illustrate, the device(s) 106 may include a display device in the vehicle 104, a fleet control center, or an airline control center. The computer system 102 may provide output to the device(s) 106 in response to the route evaluation. For example, the computer system 102 may output, to the device(s) 106, an indication of the cost penalty via an application programming interface (API). As an example, the computer system 102 may output, to the device(s) 106, an indication to adjust a fee (e.g., one or more fees charged to customers for future flights following the same or similar route as the one under evaluation) associated with the route, an indication to update the route (e.g., a flight plan), an indication to update a model used to generate a plan (e.g., a flight plan), an indication to inspect the vehicle for mechanical issues, an indication to perform maintenance on the vehicle, or any combination thereof.

The database 108 may be or include a storage device (or data structure) that stores data associated with the route 118b of the vehicle 104. The database 108 may obtain and store the data associated with the route 118b for use by other device(s), such as the computer system 102. The database 108 may be in communication with the computer system 102 and/or the vehicle 104. In some examples, the database 108 is external to the computer system 102. In some cases, the database 108 is integrated in the computer system 102. In some examples, the database 108 corresponds to or is included in a server, an external memory, a distributed storage system, or a combination thereof. In some examples, the device(s) 106 are external to the computer system 102, the vehicle 104, or both. In other examples, the device(s) 106 are integrated in the computer system 102, the vehicle 104, or both.

The computer system 102, the vehicle 104, the device(s) 106, and the database 108 are shown as separate from each other as an example. In some cases, any of the computer system 102, the vehicle 104, the device(s) 106, and the database 108 may be integrated as a single device or apparatus. As an example, the computer system 102, the device(s) 106, and/or the database 108 may be integrated as a computer system.

Figure 2:
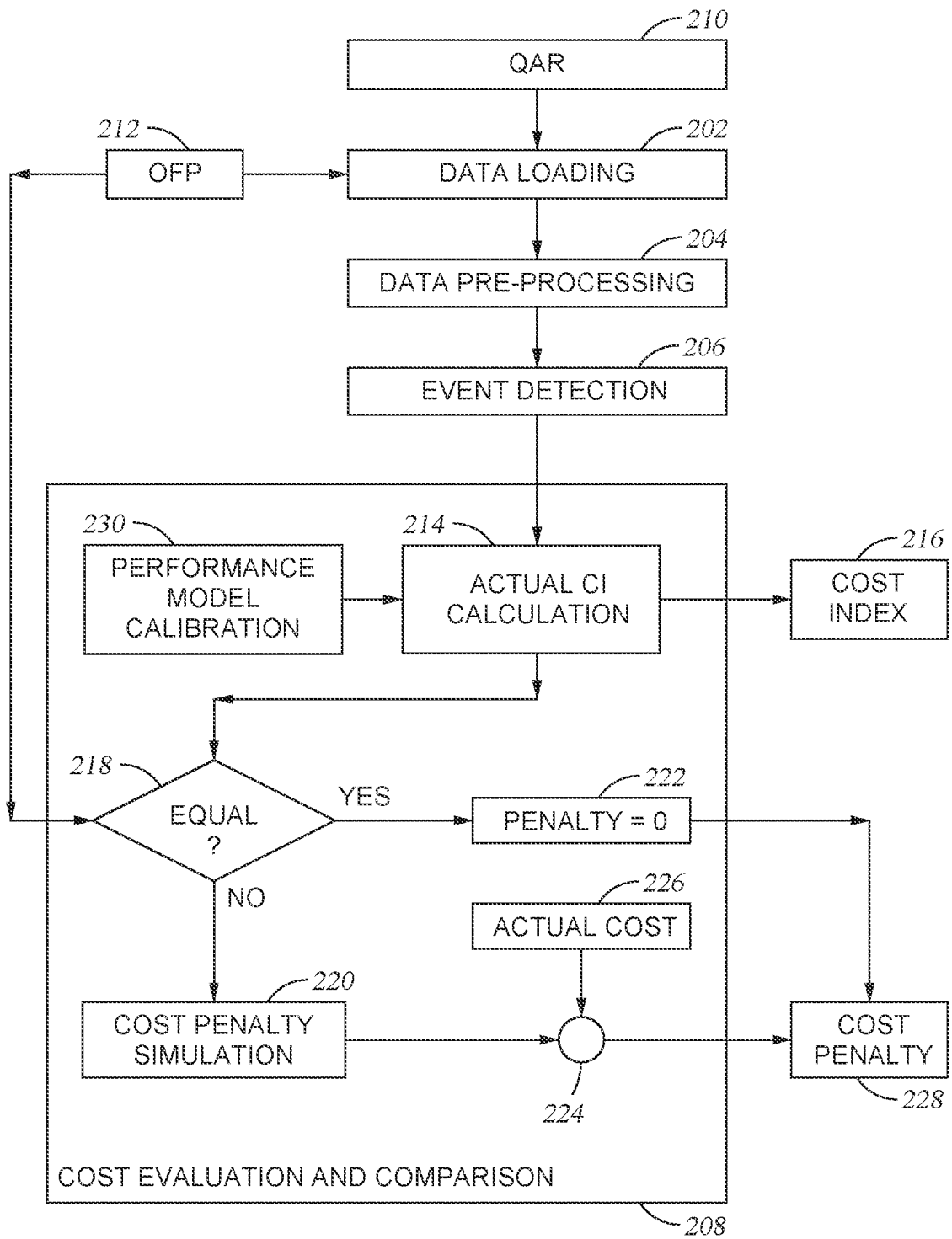
FIG. 2 is a diagram illustrating example operations for evaluating a route of a vehicle.

FIG. 2 is a diagram illustrating example operations 200 for evaluating a route of a vehicle, such as determining a cost penalty associated with the route. The operations 200 may be performed by a computer system (e.g., the computer system 102). In certain aspects, the vehicle route analyzer 116 of the computer system 102 may perform any of the aspects associated with the operations 200. The operations 200 may be implemented as software components (e.g., the computer-readable instructions 114) that are executed on one or more processors (e.g., the processor 110) of an apparatus (e.g., the computer system 102) to cause the apparatus to perform any aspect of the operations 200.

At block 202, the computer system may obtain flight data 210 associated a route (e.g., the route 118b) of an aircraft (e.g., the vehicle 104) and/or an operational flight plan (OFP) 212 for the route. The computer system may retrieve the flight data 210 from the database 108 and/or receive the flight data from the aircraft. The flight data 210 may include data generated by sensors and/or instruments of the aircraft during various phases of the flight. In certain aspects, the flight data 210 may include data generated via a quick access recorder (QAR) of an aircraft. For example, the flight data 210 may include one or more entries indicating various information associated with the flight, including, for example, time, pressure altitude, altitude (Hp), flight path angle (y), air temperature (T), Mach number (M) (e.g., including the commanded Mach), aircraft mass (m), fuel flow (FF), aircraft gross weight, airspeed, ground speed, wind speed, wind direction, heading, course, normal acceleration, longitudinal acceleration, lateral acceleration, pitch trim position, angle of attack, pitch attitude, roll attitude, radio transmission keying, power on each engine, thrust reverser position, auto pilot engagement status, latitude, longitude, one or more other parameters associated with the flight, or a combination thereof. In some cases, the information in the flight data 210 may be derived from one or more sensor readings or measurements.

The OFP 212 may ensure an aircraft meets all of the operational regulations for a specific flight, give the flight crew information to help them conduct the flight safely, and/or coordinate with air traffic control (ATC) and/or other aircraft. As an example, an OFP 212 may include the route the crew will fly and specify altitudes and speeds over the course of the flight. The OFP 212 may provide calculations for how much fuel the aircraft will use and the additional fuel to carry to meet various safety specifications. The OFP 212 may include the cost index used to determine and/or calculate aspects of the OFP 212, such as the route, altitudes, and/or speeds. The cost index associated with the OFP 212 may be evaluated against an actual cost index determined using the flight data 210, as further described herein.

At block 204, the computer system may perform data pre-processing on the flight data 210. After loading the flight data, computer system may validate the flight data to discard erroneous information, for example, due to errors in sensor readings or decoding. In some aspects, the flight data 210 may include entries corresponding to outliers, measurement errors, noise, extraneous information, or a combination thereof. The computer system may discard certain entries, such as entries corresponding to outliers, measurement errors, or both, from the flight data 210, and/or substitute erroneous entries with estimated values. The flight data may be validated by checking the physical relationship between different variables. The computer system may compare a particular variable or entry (e.g., wind speed) with an estimated value for the wind speed derived using other sensor readings. For example, the computer system may estimate the wind speed (and other wind related information) via the ground speed and the airspeed based on a relationship between wind speed, true airspeed, and ground speed. Suppose, for example, the flight data indicates that there is a constant wind speed during a portion of the flight. Such a constant wind information may not be compatible with the estimation for the wind speed. The computer system may substitute erroneous information with the estimated values determined or derived using the other flight information.

The flight data may be cleaned of outliers. In some aspects, the outliers, which may produce errors in subsequent computations, may be removed from the flight data. For example, the computer system may remove erroneous data points, outliers, data points corresponding to redundant information, or a combination thereof. As an example, the computer system may remove data points corresponding to flight variables that are not relevant for the flight plan evaluation.

In some cases, the computer system may apply one or more filters to smooth the noise present in the flight data 210. The flight data may be filtered to remove and/or reduce noise, for example, using a moving mean approach and/or one or more Savitzky-Golay filters. The flight data may perform filtering of the cleaned (validated) version of the flight data 210.

In certain aspects, the computer system may perform segmentation of the flight data. The computer system may select one or more segments or phases of the flight data for further processing. The computer system may identify one or more flight phases associated with the flight data 210 for further processing. For example, data points may be classified into the phases of a flight, for example, using an altitude stability criterion in order to obtain data points associated with one or more phases of the flight, such as the cruise phase. As an example, the flight phases may include a taxi out phase, a takeoff phase, a climb phase, a cruise phase, a descent phase, an approach phase, a go around phase, a taxi in phase, one or more other phases, or a combination thereof.

At block 206, the computer system may perform event detection on the flight data associated with the one or more selected phases. The event detection may serve as a dimensionality reduction to reduce the amount of data to be processed for the cost evaluation and comparison at block 208. Such data reduction may improve processing performance of the computer system, such as reducing the computational time. As an example, the computer system may apply signal processing techniques to further divide the cruise phase into certain events. For example, an event may correspond to where a specific change in one or more flight variables is observed. The events may correspond to changes that may have a financial cost or environmental cost on the flight. During event detection, the computer system may check the FMC commanded Mach, ground speed, wind speed, and wind direction signals.

Figure 3A:
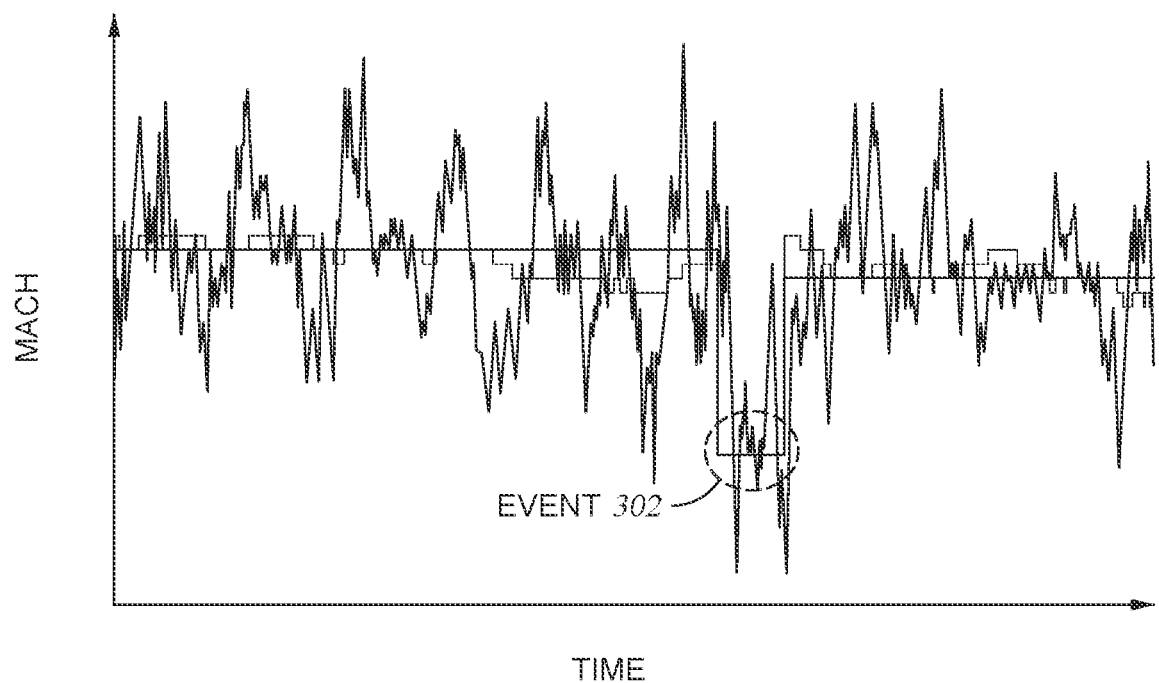
FIGS. 3A and 3B illustrate example graphs of flight data in which an event is selected for further evaluation and another event is discarded.
Figure 3B:
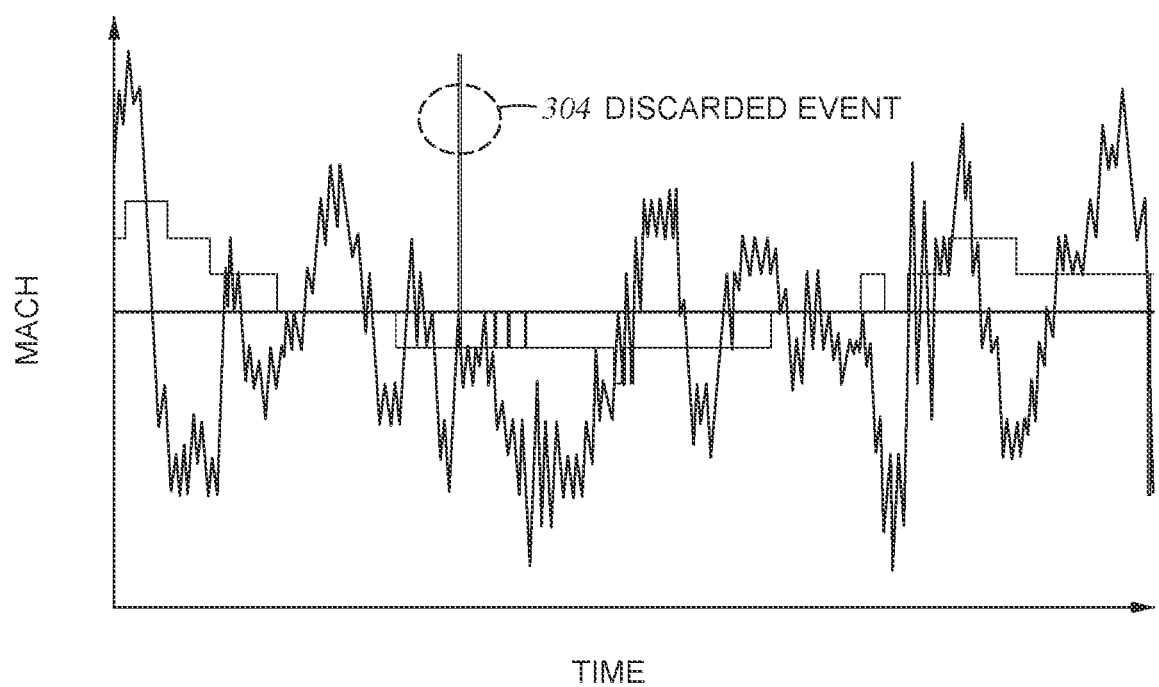

The event detection operations—by way of non-limiting example—may have two parts which may be run sequentially. The first part is focused on finding patterns (constant regimes, sudden changes, and/or soft transitions) and evaluates the patterns to find relevant events (e.g., events that affect the cost or events that have an environmental impact). Certain events may be discarded, such as abrupt changes lasting short periods of time compared to the entire flight duration, soft transitions that have a minimal change on the CI value, and/or other irrelevant events in terms of the overall performance of the flight. FIGS. 3A and 3B illustrate example graphs of flight data, respectively, in which a first event 302 is selected for further evaluation and a second event 304 is discarded from further evaluation. In this example, the first event 302 may satisfy one or more criteria to be treated as an event for further evaluation, and the second event 304 may satisfy one or more criteria to be discarded.

To reduce the dimensionality of further processing (among other aspects), the computer system may perform a data reduction that analyzes the data points of each event and keeps certain data points, which may be referred to as representative points. The computer system may apply two limits in determining which data points to keep or discard. Applying a limit associated with nearby values, the first limit establishes the conditions for which the effect of the variable value variation is not relevant. Applying a feasible limit, the second limit establishes the maximum variation that the variable can have in a defined amount of time. The first limit looks for the flight conditions which do not have a relevant impact in any flight performance parameter value and the latter discards noisy values. The computer system takes the data signal to analyze and considers a point to be representative whenever the following condition is fulfilled: the point is outside the nearby values region of the previous representative point and is inside the feasible limit region. The representative points obtained from each variable above are combined with the other ones to create a final set of representative points.

Figure 4:
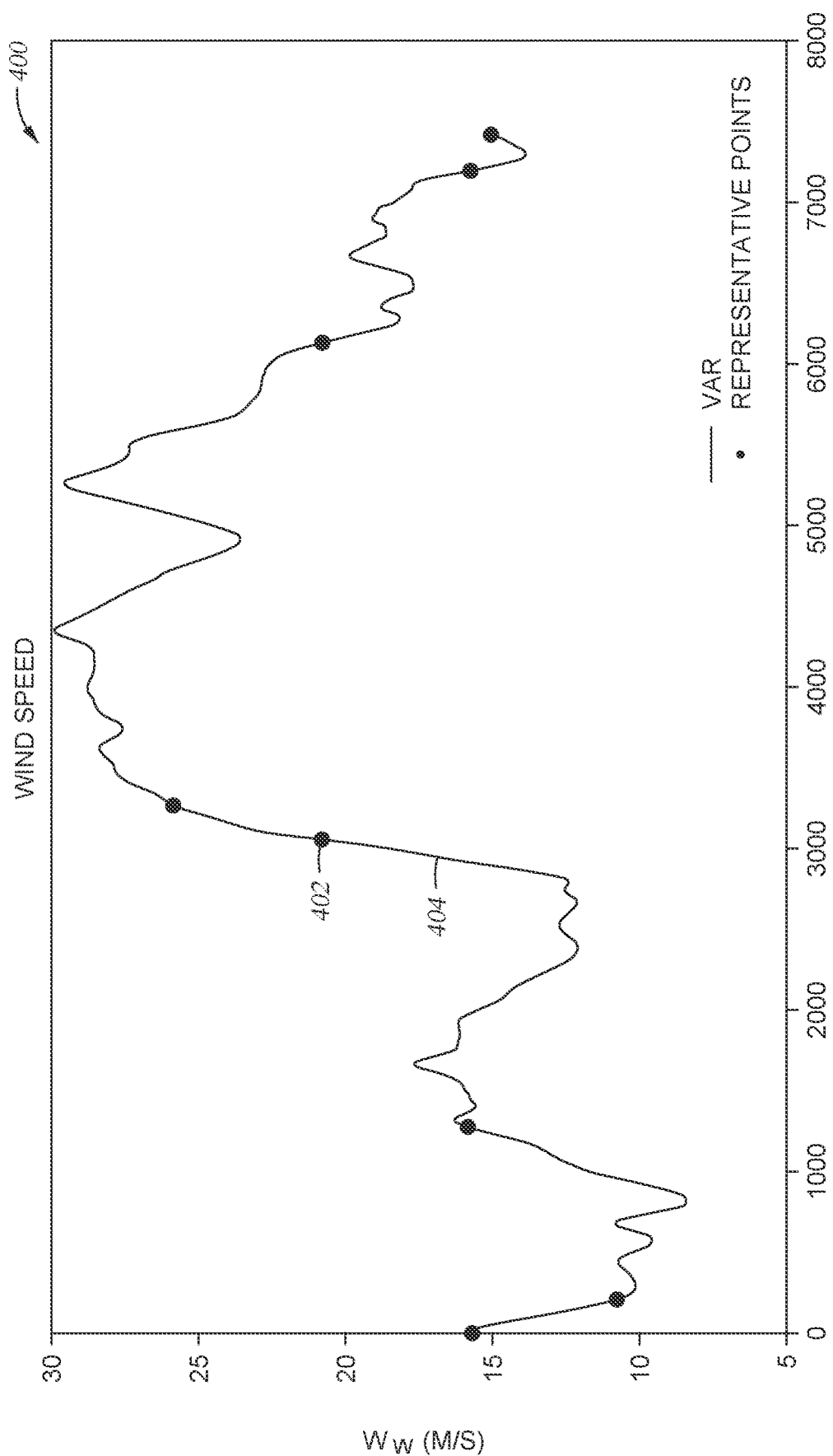
FIG. 4 illustrates an example graph of representative points in flight data points.

In certain aspects, a minimum time gap (e.g., time interval or time duration) between two consecutive representative points may be established. It may be assumed that changes in the variable value within a particular time gap (e.g., 180 seconds) may be treated as not being relevant as such changes may not last long enough to have an effect on the overall performance of the flight. The computer system may investigate each representative point (or some of the representative points) detected to satisfy a minimum time gap. The computer system may discard a representative point if the following condition is fulfilled: the time separation between the previous representative point, the representative point, and the next representative point is less than or equal to a specific time gap (e.g., 180 seconds). For example, FIG. 4 illustrates an example graph 400 of representative points 402 in flight data points 404 for wind speed after applying the minimum time gap criteria.

Referring to FIG. 2, at block 208, the computer system may perform a cost evaluation and a comparison between the processed flight data associated with the event detection and the OFP 212. For example, at block 214, the computer system may determine a cost index (CI) value 216 for each (or some) of the cruise segments detected at block 206. Such CI value(s) may be referred to as the actual CI value(s). At block 218, the computer system may compare the CI value(s) 216 to the CI value(s) associated with the OFP 212 (which may be referred to as the nominal CI value(s) or estimated CI value(s)). If differences are found between the CI value(s), at block 220, the computer system may perform a simulation of the flight that simulates if the flight had flown according to the OFP 212 and determine a cost associated with the simulated flight. After the cost of the simulation is obtained, at block 224, the computer system may compare the simulated cost to the actual cost 226 of the real flight (which can be determined as further described herein) yielding a cost penalty 228. If no differences are found between the CI value(s), the computer system may determine that the cost penalty 228 corresponds to a particular value 222 (e.g., zero).

In certain aspects, the computer system may determine the actual CI values for the flight data using performance tables associated with the specific type of aircraft used in the flight. Such tables may be available from the original equipment manufacturer, by way of non-limiting example.

For certain aspects, the computer system may determine the actual CI values for the flight data using an analytical approach. For example, the computer system may determine the actual CI values for the flight data using a performance model associated with the specific type of aircraft. The performance model may include for instance the performance data tables provided by an aircraft manufacturer (e.g., in aircraft manuals and/or avionics databases) and/or a generic polynomial aircraft model, such as the Base of Aircraft Data (BADA) model. BADA is a performance model provided by EUROCONTROL and globally extended across the Air Traffic Management (ATM) community, which, as of May 2023, is understood to cover approximately over 80% of the current commercial fleet being applicable to aircraft from various manufacturers. BADA is characterized by a set of polynomials, with their corresponding coefficients. The coefficients are specific to each aircraft type and were computed by EUROCONTROL using aircraft performance data generated with manufacturer's performance software. The values of the coefficients of the different models in BADA correspond to a nominal aircraft type with no airline customization and neglecting the performance degradation that could have affected the aircraft after years in service. To consider this degradation effect in the model, at block 230, the computer system may perform a calibration of the performance model, for example, a calibration of the coefficients of the drag and fuel models used in a BADA model and/or the degradation factors used in the aircraft manufacturer's performance tables. The calibration process may determine adjustments factors for the coefficients of the drag (ACD) and the fuel (ACF) to account for the extra drag and extra fuel consumption in the actual model.

Figure 5:
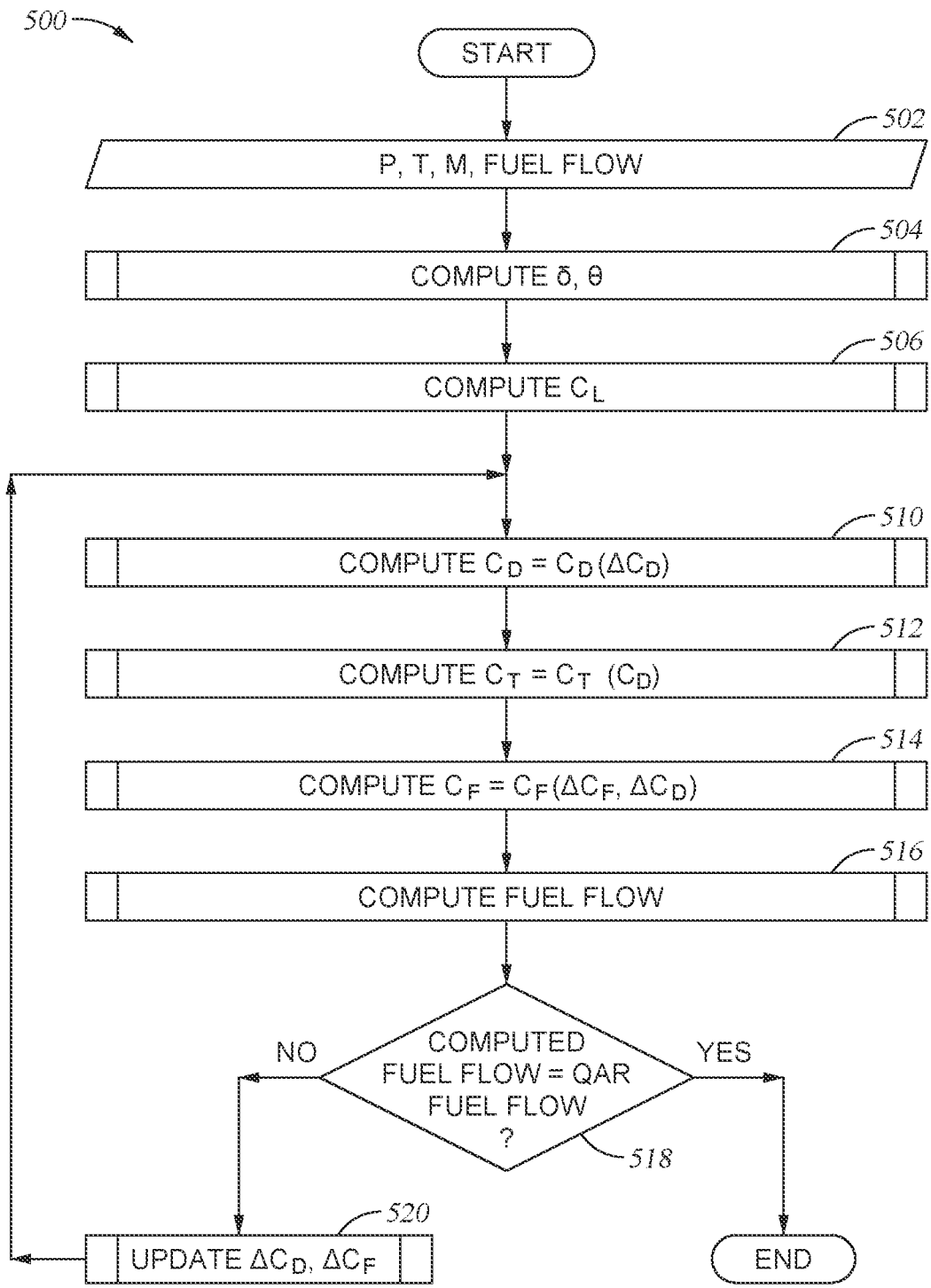
FIG. 5 is a flow diagram illustrating example operations for calibrating a performance model.

FIG. 5 is a flow diagram illustrating example operations 500 for calibrating a performance model, such as the BADA model. The operations 500 may be performed by a computer system (e.g., the computer system 102), by way of non-limiting example.

At block 502, the computer system may obtain the flight data associated with the flight. In certain aspects, as the computer system may determine a CI value for each segment of a particular phase (e.g., the cruise phase), the flight data may be associated with a specific segment of the phase. As an example, for the calibration operations, the flight data may include pressure (P), temperature (T), Mach number (M), and fuel flow. At block 504, the computer system may determine the pressure ratio (δ) and the temperature ratio (θ) based on the flight data. At block 506, the computer system may determine the lift coefficient ($C_L$) based on the flight data.

The computer system may determine various coefficients for the performance model using particular adjustment factors for the drag coefficient (ACD) and the fuel coefficient (ACF). The adjustment factors may represent the delta (or difference) between the default coefficient values for the performance model and the calibrated coefficient values (e.g., an estimate for the actual coefficient value associated with the aircraft). At block 510, the computer system may determine the drag coefficient ($C_D$) using a particular value for the adjustment factor for the drag coefficient ($\Delta C_D$). As an example, the drag coefficient ($C_D$) may be expressed as a function of lift coefficient $C_L$, Mach number M, high lift devices position $\delta_{HL}$, landing gear position OLG, and speed brakes position $\delta_{SB}$. In some cases, the computer system may initially apply the default value for the drag coefficient as provided by the performance model, and thus, the adjustment factor $\Delta C_D$ may initially be zero. In certain cases, the computer system may use a non-zero value for the adjustment factor for the drag coefficient $\Delta C_D$. At block 512, the computer system may determine the thrust coefficient ($C_T$) using the adjustment factor for the draft coefficient ($\Delta C_D$). As an example, the thrust coefficient ($C_T$) may depend on the Mach number (M) and the throttle parameter $\delta_T$. At block 514, the computer system may determine the fuel coefficient ($C_F$) using the adjustment factors for the draft coefficient and the fuel coefficient ($\Delta C_D$ and $\Delta C_F$). As an example, the fuel coefficient ($C_F$) may be expressed as a function of the Mach number (M) and the thrust coefficient ($C_T$). At block 516, the computer system may determine the fuel flow using the performance model.

At block 518, the computer system may compare the modeled fuel flow with the actual fuel flow associated with the flight data. If the modeled fuel flow is not equal to the actual fuel flow (or outside a margin of error, e.g., +1%), the computer system may update the adjustment factors for the drag coefficient ($\Delta C_D$) and/or the fuel coefficient ($\Delta C_F$). As an example, the computer system may increase or decrease the adjustment factors by a particular step (e.g., +1%). If the modeled fuel flow is equal to the actual fuel flow (or within a margin of error, e.g., +1%), the calibration process may be considered to be complete. In some cases, the computer system may determine the calibration is complete after performing a certain number of iterations of adjusting the adjustment factors.

Figure 6:
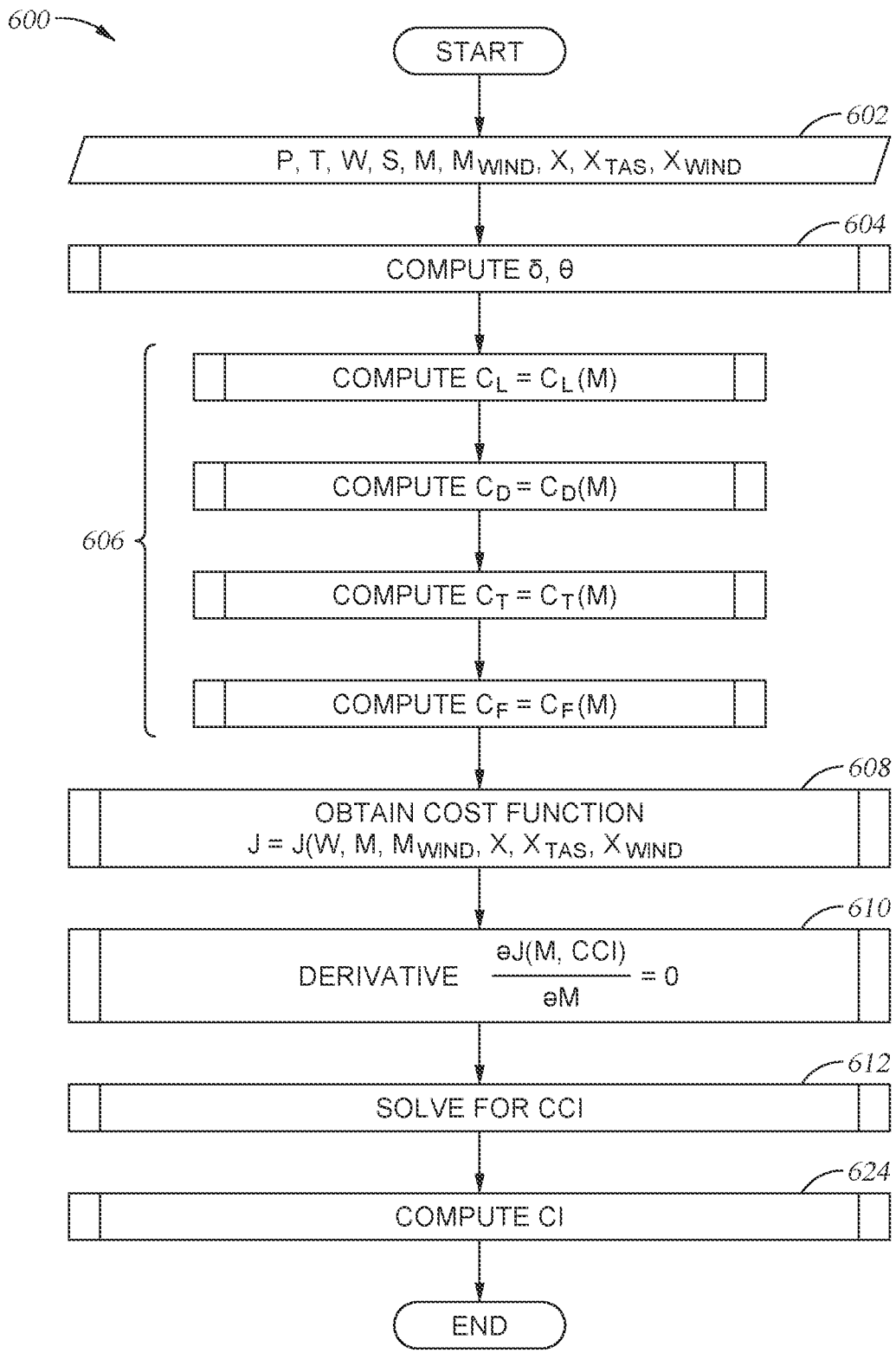
FIG. 6 is a flow diagram illustrating example operations for determining a cost index (CI) associated with a segment of a particular flight phase using a performance model.

FIG. 6 is a flow diagram illustrating example operations 600 for determining a cost index (CI) associated with a segment of a particular flight phase (e.g., the cruise phase) using a performance model, such as a calibrated performance model as described herein with respect to FIG. 5.

At block 602, the computer system may obtain the flight data associated with the flight. As an example, the flight data may include pressure (P), temperature (T), weight (W), Mach number (M), wind's Mach number $M_{wind}$ (e.g., wind speed divided by the speed of sound at the given atmospheric conditions), true track angle (x), true airspeed angle ($X_{TAS}$), and/or wind angle ($X_{wind}$). At block 604, the computer system may determine the pressure ratio (δ) and the temperature ratio (θ) based on the flight data. At blocks 606, the computer system may determine the various modeling coefficients associated with a performance model including, for example, the lift coefficient ($C_L$), the drag coefficient ($C_D$), the thrust coefficient ($C_T$), and the fuel coefficient ($C_F$). The computer system may apply the adjustment factors as determined via the calibration process described herein. At block 608, the computer system may determine a cost function for the flight segment based on the flight data and the aircraft coefficients. At block 610, the computer system may perform a regression analysis to determine a minimum cost of the cost function, for example, where a derivative of the cost function that depends on a corrected cost index (CCI) is equal to zero. At block 612, the computer system may determine the CCI based on where the derivative of the cost function is equal to zero. At block 614, the computer system may determine the CI for the segment of the flight phase based at least on the CCI.

After an actual CI value is determined for each segment of the cruise phase, the computer system may compare the actual CI value against the nominal CI associated with the flight plan. If there are differences between any of the calculated CIs and the one in the flight plan, then a simulation routine is launched in order to obtain the cost of the flight if it had flown according to the CI in the flight plan. The simulation may integrate the equations of motion of the aircraft, using actual flight conditions (such as the lateral route, weather and altitude) from the flight data. The simulation may use the Mach number associated with the flight plan (e.g., ECON Mach number). The simulation may determine the fuel consumption and the duration of the cruise phase. The cost (C) associated with the flight may be determined according to the following expression:

$$C = \sum_{i=1}^{N} f_i + CI_i \cdot d_i \qquad (1)$$

where N is the number of segments in the cruise phase, $f_i$ is the fuel consumption for the given segment (e.g., the segment corresponding to i), $CI_i$ is the cost index for a given segment, and di is the duration of the given segment. The nominal cost may be determined according to Equation (1) based on the simulated fuel consumption and simulated duration.

To compute the ECON Mach number, the computer system may determine the Mach number based on a CI. In the case of the analytical method using BADA as a performance model, the computer system may use the same operations as described herein with respect to FIG. 6, but now the CI is known and the unknown variable is the Mach number. Given a CI value, the computer system may use an iterative process to calculate the ECON Mach number for that CI.

After the cost of the simulation is obtained, the computer system may compare the actual cost 226 with the simulated cost, and the computer system may determine the cost penalty 228 as the difference between the actual cost 226 and the simulated cost. This cost penalty can be used by an airline to perform any of various actions. For example, the cost penalty may allow an airline to identify the root causes of the cost inefficiencies and derive improvements strategies for the flight operations. In some cases, the computer system may evaluate the cost penalty and output an indication based on the cost penalty. As an example, the computer system may output an indication to adjust a fee (e.g., one or more fees charged to customers for the flight) associated with the route, an indication to update the route (e.g., a flight plan), an indication to update a model used to generate the flight plan, an indication to inspect the aircraft for mechanical issues, an indication to perform maintenance on the vehicle, or any combination thereof.

In certain aspects, the computer system may determine cost penalties associated with multiple flights. The cost penalties may allow an airline to evaluate the performance of the flights and/or aircraft.

Figure 7A:
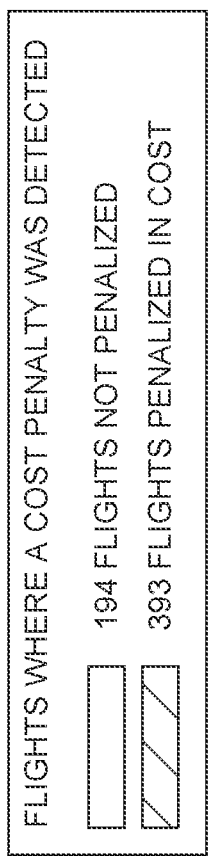
FIGS. 7A and 7B illustrate example charts of cost penalties among multiple flights for a particular type of aircraft.
Figure 7A:
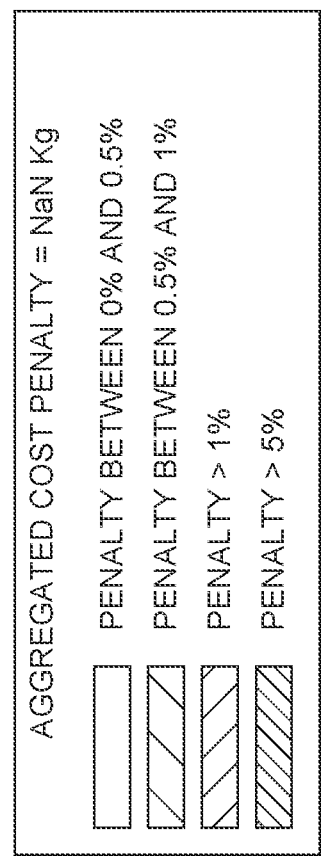
Figure 7A:
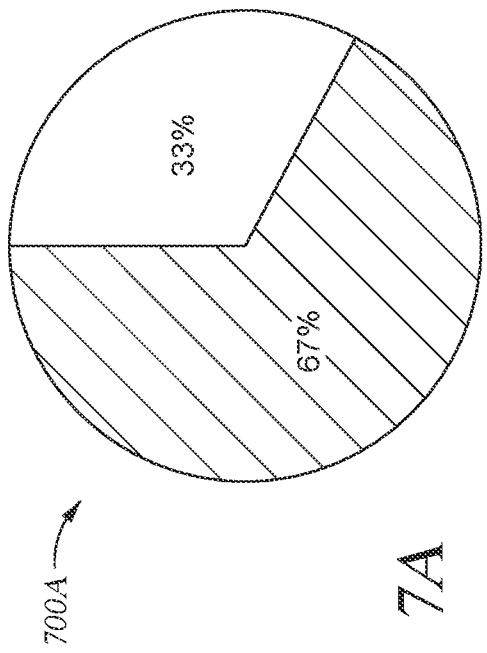
Figure 7B:
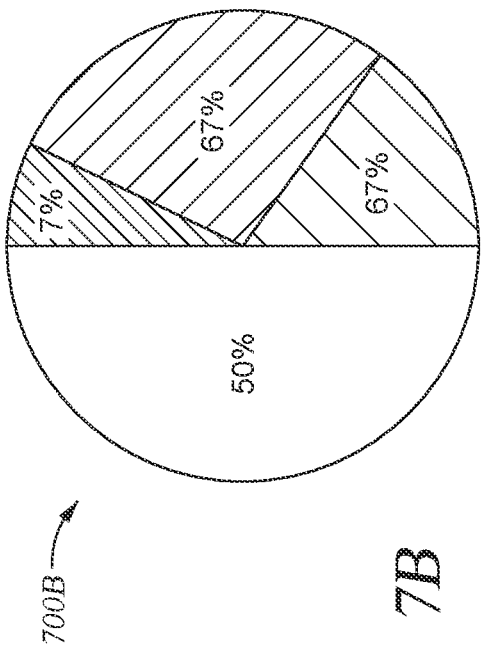

FIGS. 7A and 7B illustrate example charts 700A, 700B of cost penalties, respectively, among multiple flights for a particular type of aircraft. In this example, cost penalties associated with 587 flights of different Boeing 737-800 aircraft were determined based on the flight data as described herein. As depicted in the first chart 700A, about two-thirds of the flights (393) encountered cost-incurring events that penalized the performance of the flight. As depicted in the second chart 700B, half of the flights had small penalties (e.g., less than 0.5%), when comparing the flights with the simulation using the CI in the flight plan. Over a third (36%) had penalties of over 1%, with nearly one-fifth of those penalties being above 5%. By analyzing the root cause of the penalties that exceed 5%, for example, an airline may reduce the number of penalizing events that occur during operations and increase cost efficiency, which may improve the profitability of flights and/or reduce the environmental impact of flights.

Figure 8:
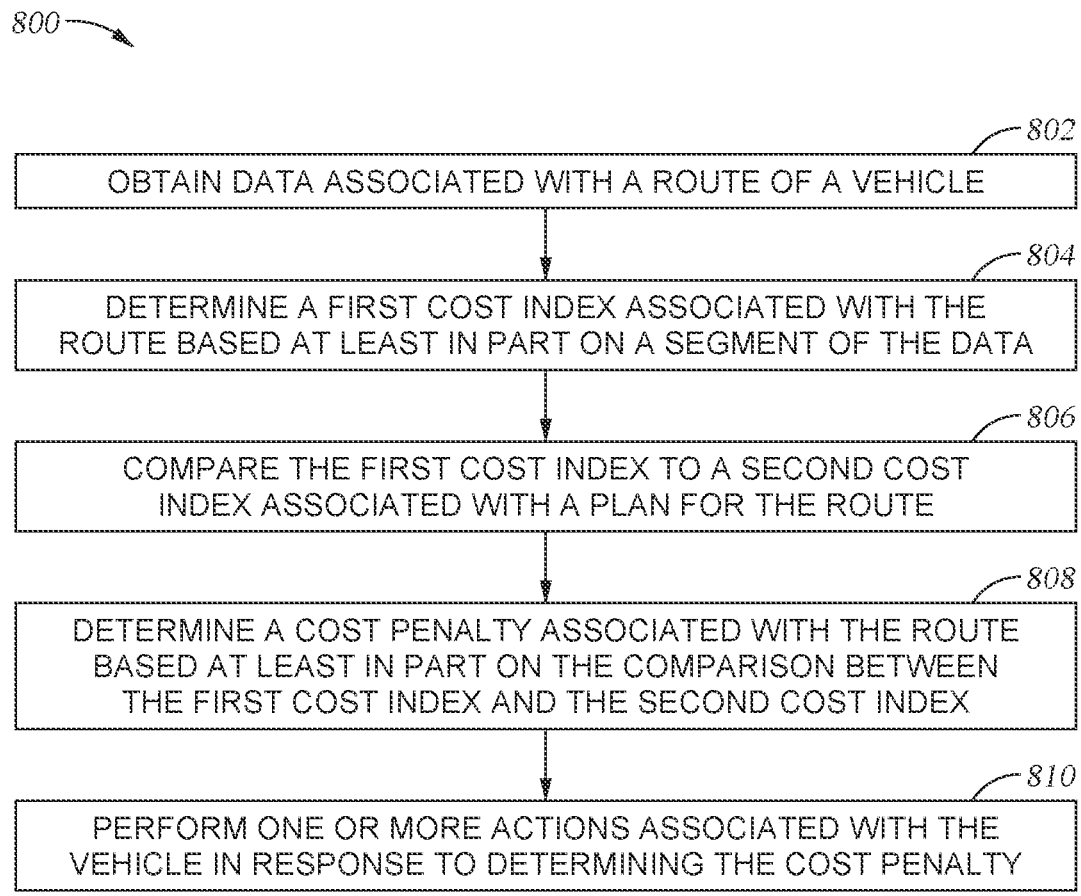
FIG. 8 is a method flow diagram illustrating example operations for route evaluation associated with a vehicle.

FIG. 8 is a method flow diagram illustrating example operations 800 for route evaluation associated with a vehicle. The operations 800 may be performed, for example, by a computer system (e.g., the computer system as depicted in FIG. 1) and/or a fleet operator (e.g., an airline).

The operations 800 may optionally begin, at block 802, where the computer system may obtain data (e.g., the flight data 210) associated with a route (e.g., the route 118*b*) of a vehicle (e.g., the vehicle 104). For example, the computer system may obtain the data via the database 108, which may collect the flight data recorded from one or more flights. In certain aspects, the vehicle may include an aircraft, spacecraft, watercraft, barge, car, bus, truck, motorcycle, train, railway, trolley, pipeline, combinations thereof, etc.

At block 804, the computer system may determine a first cost index (e.g., an actual CI) associated with the route based at least in part on a segment of the data (e.g., at least a segment of the cruise phase and/or any other flight phase). For example, the computer system may perform data preprocessing and event detection on the data. The computer system may determine the actual CI associated with the route based on the processed data corresponding to the segment.

At block 806, the computer system may compare the first cost index to a second cost index (e.g., the nominal CI used to generate the plan) associated with a plan (e.g., the OFP 212) for the route. The second cost index may be used to determine or generate the plan as described herein. For example, the computer system may determine whether the first cost index is equal to the second cost index or within a range from the second cost index (e.g., a predetermined margin of error of +0.01%). In some aspects, the computer system may determine whether a difference between the first cost index and the second cost index is within a specified range (e.g., the predetermined margin of error). In response to determining that the first cost index is different (e.g., not equal to or not within a margin of error) than the second cost index, the computer system may perform a simulation associated with the plan to determine a simulated fuel consumption and duration. The computer system may determine the cost associated with the simulation, for example, according to Equation (1). In response to determining that the first cost index is the same (e.g., equal to or within the predetermined margin of error) as the second cost index, the computer system may set the cost penalty to a particular value, for example, zero.

At block 808, the computer system may determine a cost penalty associated with the route based at least in part on the comparison between the first cost index and the second cost index. For example, the computer system may determine a difference between a simulated cost as determined according to the OFP and an actual cost associated with the route as determined based on the actual CI.

At block 810, the computer system may perform one or more actions associated with the vehicle in response to determining the cost penalty. For example, the computer system may indicate to an end user device (e.g., the device 106) to perform any of various actions. To perform the action(s), the computer system may output an indication of the cost penalty via an application programming interface (API) to a computing device (e.g., the device 106). In some cases, the computer system may determine cost penalties associated with multiple vehicles, including the vehicle, and outputting a metric (e.g., a pie chart, bar chart, or similar graphical comparison) associated with the cost penalties to the computing device. For example, the computer system may provide an analysis of the cost penalties associated with the multiple vehicles, such as the pie charts depicted in FIGS. 7A and 7B. The computer system may output an alert associated with the vehicle to the computing device. In some cases, the alert may indicate a degree associated with the cost penalty. In certain cases, the alert may indicate and/or indicate to an operator of the vehicle (e.g., an airline) to adjust a fee (e.g., a price paid by a customer) associated with the route for a future trip (e.g., a future flight) of the route to improve the profitability of the future trip, update the route of the vehicle for the future trip to reduce the cost and/or environmental impact, update a model (e.g., the performance model to generate the OFP) used to generate the plan for the route, inspect the vehicle, perform maintenance on the vehicle, or retire the vehicle, or a combination thereof.

In certain aspects, the computer system may perform pre-processing on the data, for example, as described herein with respect to FIG. 2. For example, the computer system may perform one or more pre-processing operations (including, for example, data validation, data cleaning, and/or data filtering) on the data. The computer system may identify the segment of the data corresponding to one or more phases (e.g., the cruise phase) of the route.

For certain aspects, the computer system may perform event detection on the pre-processed data, for example, as described herein with respect to FIG. 2. For example, the computer system may identify one or more events associated with the segment of the data. In some cases, the computer system may determine the actual cost index associated with each of the events or each segment including one or more events. To determine the first cost index, the computer system may determine the first cost index for an event among the identified event(s) in the segment of the data.

In certain aspects, the computer system may perform a cost evaluation and comparison associated with the planned route and the actual route, for example, as described herein with respect to FIG. 2. For example, the computer system may determine one or more parameter values (e.g., the calibrated coefficient values and/or adjustment factors) based at least in part on a performance model (e.g., BADA and/or a manufacturer database associated with the vehicle) associated with the vehicle and the segment of the data. The computer system may determine the first cost index based at least part on the one or more parameter values and the segment of the data, for example, as described herein with respect to FIG. 6. To determine the cost penalty, the computer system may perform a simulation to determine a first cost (e.g., a simulated cost) associated with the plan for the route in response to the first cost index not being equal to the second cost index. The computer system may determine a second cost associated with the route, for example, the actual cost 226. The computer system may determine the second cost based at least in part on the first cost index, a fuel consumption for at least a portion of the route, and a duration for the at least the portion. The computer system may determine the cost penalty based at least in part on a comparison between the first cost and the second cost, such as determining the difference between the first cost and the second cost. In response to the first cost index being equal to the second cost index, the computer system may set the cost penalty to a particular value (e.g., zero).

In certain aspects, the data may include any of various information associated with route, which may be derived or generated by sensors and/or instruments of the vehicle during various phases of the route. As an example, the data may include one or more time-series including: pressure information, altitude information, fuel flow information, gross weight information, wind speed information, wind direction information, total air temperature information, Mach number information, heading information, course information, time information, latitude information, longitude information, or a combination thereof. In certain aspects, the data may include one or more time-series of sensor information recorded during the route of the vehicle.

It will be appreciated that the apparatus and methods for determining the cost penalty associated with a flight may provide various advantages. For example, the cost penalty determination described herein may allow an airline to adjust the economic cost a flight to be more profitable and/or reduce the environmental impact of a flight.

In the current disclosure, reference is made to various aspects. However, it should be understood that the present disclosure is not limited to specific described aspects. Instead, any combination of the following features and elements, whether related to different aspects or not, is contemplated to implement and practice the teachings provided herein. Additionally, when elements of the aspects are described in the form of "at least one of A and B," it will be understood that aspects including element A exclusively, including element B exclusively, and including element A and B are each contemplated. Furthermore, although some aspects may achieve advantages over other possible solutions and/or over the prior art, whether or not a particular advantage is achieved by a given aspect is not limiting of the present disclosure. Thus, the aspects, features, aspects and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects described herein may be embodied as a system, method or computer program product. Accordingly, aspects may take the form of an entirely hardware aspect, an entirely software aspect (including firmware, resident software, micro-code, etc.) or an aspect combining software and hardware aspects that may all generally be referred to herein as a "circuit," "module" or "system." Furthermore, aspects described herein may take the form of a computer program product embodied in one or more computer readable storage medium(s) having computer readable program code embodied thereon.

Program code embodied on a computer readable storage medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to aspects of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various aspects of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While the foregoing is directed to aspects of the present disclosure, other and further aspects of the disclosure may be devised without departing from the basic scope thereof, and the scope thereof is determined by the claims that follow.

What is claimed is:

1. A method, comprising:
   obtaining data associated with a route of an aircraft;
   applying a filter to the data to reduce noise;
   detecting an event from a pattern in the data;
   calibrating a performance model associated with the aircraft by:
      determining a plurality of estimated coefficients;
      determining a modeled fuel flow using the performance model and the plurality of estimated coefficients;
      comparing the modeled fuel flow with an actual fuel flow associated with the data; and
      determining a plurality of adjusted coefficients based on the comparison between the modeled fuel flow and the actual fuel flow;
   determining a first cost index associated with the route based at least in part on a segment of the data associated with the event, wherein the first cost index is determined using the performance model and the plurality of adjusted coefficients;
   comparing the first cost index to a second cost index associated with a plan for the route, wherein the second cost index is used to determine the plan;
   determining a cost penalty associated with the route based at least in part on the comparison between the first cost index and the second cost index; and
   performing one or more actions associated with the aircraft in response to determining the cost penalty.

2. The method of claim 1, further comprising:
   performing one or more pre-processing operations on the data; and
   identifying the segment of the data corresponding to one or more phases of the route.

3. The method of claim 1, wherein determining the first cost index comprises:
   determining one or more parameter values based at least in part on the performance model associated with the aircraft and the segment of the data; and
   determining the first cost index based at least part on the one or more parameter values and the segment of the data.

4. The method of claim 1, wherein comparing the first cost index comprises determining whether a difference between the first cost index and the second cost index is within a specified range.

5. The method of claim 1, wherein determining the cost penalty comprises:
   performing a simulation to determine a first cost associated with the plan for the route in response to the first cost index not being equal to the second cost index;
   determining a second cost associated with the route based at least in part on the first cost index, a fuel consumption for at least a portion of the route, and a duration for the at least the portion; and
   determining the cost penalty based at least in part on a comparison between the first cost and the second cost.

6. The method of claim 1, wherein determining the cost penalty comprises setting the cost penalty to a particular value in response to the first cost index being equal to the second cost index.

7. The method of claim 1, wherein the data comprises one or more time-series including: pressure information, altitude information, fuel flow information, gross weight information, wind speed information, wind direction information, total air temperature information, Mach number information, heading information, course information, time information, latitude information, longitude information, or a combination thereof.

8. The method of claim 1, wherein the data includes one or more time-series of sensor information recorded during the route of the aircraft.

9. The method of claim 1, wherein performing the one or more actions comprises:
   outputting an indication of the cost penalty via an application programming interface (API) to a computing device;
   determining cost penalties associated with multiple vehicles, including the aircraft, and outputting a metric associated with the cost penalties to the computing device;
   outputting an alert associated with the aircraft to the computing device;
   adjusting a fee associated with the route for a future trip of the route;

updating the route of the aircraft for the future trip;
updating a model used to generate the plan for the route;
inspecting the aircraft;
performing maintenance on the aircraft; or
a combination thereof.

10. An apparatus, comprising:
a memory; and
one or more processors coupled to the memory, the one or more processors being configured to:
obtain data associated with a route of an aircraft,
apply a filter to the data to reduce noise;
detect an event from a pattern in the data;
calibrate a performance model associated with the aircraft by:
determining a plurality of estimated coefficients;
determining a modeled fuel flow using the performance model and the plurality of estimated coefficients;
comparing the modeled fuel flow with an actual fuel flow associated with the data; and
determining a plurality of adjusted coefficients based on the comparison between the modeled fuel flow and the actual fuel flow;
determine a first cost index associated with the route based at least in part on a segment of the data associated with the event, wherein the first cost index is determined using the performance model and the plurality of adjusted coefficients,
compare the first cost index to a second cost index associated with a plan for the route, wherein the second cost index is used to determine the plan,
determine a cost penalty associated with the route based at least in part on the comparison between the first cost index and the second cost index, and
perform one or more actions associated with the aircraft in response to determining the cost penalty.

11. The apparatus of claim 10, wherein the one or more processors are further configured to:
perform one or more pre-processing operations on the data; and
identify the segment of the data corresponding to one or more phases of the route.

12. The apparatus of claim 10, wherein:
to determine the first cost index, the one or more processors are further configured to:
determine one or more parameter values based at least in part on the performance model associated with the aircraft and the segment of the data, and
determine the first cost index based at least part on the one or more parameter values and the segment of the data; and
to compare the first cost index, the one or more processors are configured to determine whether the first cost index is equal to the second cost index.

13. The apparatus of claim 10, wherein to determine the cost penalty, the one or more processors are further configured to:
perform a simulation to determine a first cost associated with the plan for the route in response to the first cost index not being equal to the second cost index;
determine a second cost associated with the route based at least in part on the first cost index, a fuel consumption for at least a portion of the route, and a duration for the at least the portion; and
determine the cost penalty based at least in part on a comparison between the first cost and the second cost.

14. The apparatus of claim 10, wherein to determine the cost penalty, the one or more processors are further configured to set the cost penalty to a particular value in response to the first cost index being equal to the second cost index.

15. The apparatus of claim 10, wherein:
the data comprises one or more time-series including: pressure information, altitude information, fuel flow information, gross weight information, wind speed information, wind direction information, total air temperature information, Mach number information, heading information, course information, time information, latitude information, longitude information, or a combination thereof.

16. The apparatus of claim 10, wherein to perform the one or more actions, the one or more processors are configured to:
output an indication of the cost penalty via an application programming interface (API) to a computing device;
determine cost penalties associated with multiple vehicles, including the aircraft, and outputting a metric associated with the cost penalties to the computing device;
output an alert associated with the aircraft to the computing device;
adjust a fee associated with the route for a future trip of the route;
update the route of the aircraft for the future trip;
update a model used to generate the plan for the route;
output an indication to inspect the aircraft to the computing device;
output an indication to perform maintenance on the aircraft; or
a combination thereof.

17. A non-transitory computer-readable medium storing code that, when executed by one or more processors of an apparatus, cause the apparatus to perform a method, the method comprising:
obtaining data associated with a route of an aircraft;
applying a filter to the data to reduce noise;
detecting an event from a pattern in the data;
calibrating a performance model associated with the aircraft by:
determining a plurality of estimated coefficients;
determining a modeled fuel flow using the performance model and the plurality of estimated coefficients;
comparing the modeled fuel flow with an actual fuel flow associated with the data; and
determining a plurality of adjusted coefficients based on the comparison between the modeled fuel flow and the actual fuel flow;
determining a first cost index associated with the route based at least in part on a segment of the data associated with the event, wherein the first cost index is determined using the performance model and the plurality of adjusted coefficients;
comparing the first cost index to a second cost index associated with a plan for the route, wherein the second cost index is used to determine the plan;
determining a cost penalty associated with the route based at least in part on the comparison between the first cost index and the second cost index; and
performing one or more actions associated with the aircraft in response to determining the cost penalty.

18. The non-transitory computer-readable medium of claim 17, wherein determining the cost penalty comprises:

performing a simulation to determine a first cost associated with the plan for the route in response to the first cost index not being equal to the second cost index;

determining a second cost associated with the route based at least in part on the first cost index, a fuel consumption for at least a portion of the route, and a duration for the at least the portion; and determining the cost penalty based at least in part on a comparison between the first cost and the second cost.

19. The non-transitory computer-readable medium of claim 17, wherein the data comprises one or more time-series including: pressure information, altitude information, fuel flow information, gross weight information, wind speed information, wind direction information, total air temperature information, Mach number information, heading information, course information, time information, latitude information, longitude information, or a combination thereof.

20. The non-transitory computer-readable medium of claim 17, wherein performing the one or more actions comprises:

outputting an indication of the cost penalty via an application programming interface (API) to a computing device;

determining cost penalties associated with multiple vehicles, including the aircraft, and outputting a metric associated with the cost penalties to the computing device;

outputting an alert associated with the aircraft to the computing device;

adjusting a fee associated with the route for a future trip of the route;

updating the route of the aircraft for the future trip;

updating a model used to generate the plan for the route;

inspecting the aircraft;

performing maintenance on the aircraft; or a combination thereof.

* * * * *